United States Patent
Watanabe et al.

(10) Patent No.: US 7,113,785 B2
(45) Date of Patent: Sep. 26, 2006

(54) METHOD OF LOCATION REGISTRATION, LOCATION REGISTRATION SYSTEM, MOBILE COMMUNICATION TERMINAL EQUIPMENT FOR SETTING UP LOCATION REGISTRATION AREA, AND PROGRAM FOR SETTING UP LOCATION REGISTRATION AREA

(75) Inventors: Yugo Watanabe, Chiyoda-ku (JP); Masumi Fujiwara, Chiyoda-ku (JP); Masami Yabusaki, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 587 days.

(21) Appl. No.: 10/190,659

(22) Filed: Jul. 9, 2002

(65) Prior Publication Data

US 2003/0027574 A1   Feb. 6, 2003

(30) Foreign Application Priority Data

Jul. 10, 2001 (JP) .............................. 2001-209963

(51) Int. Cl.
*H04Q 7/20* (2006.01)

(52) U.S. Cl. .............................. 455/435.1; 455/404.2; 455/441

(58) Field of Classification Search ............. 455/404.2, 455/433, 435.1, 441, 456.2
See application file for complete search history.

(56) References Cited

U.S. PATENT DOCUMENTS 5,713,073 A * 1/1998 Warsta ........................ 455/524
6,138,018 A   10/2000 Pashtan et al.
6,249,679 B1 * 6/2001 Guilbaud et al. ......... 455/456.3
6,272,344 B1 * 8/2001 Kojima ...................... 455/435.1
6,330,446 B1 * 12/2001 Mori ......................... 455/435.2
6,363,255 B1 * 3/2002 Kuwahara ................ 455/456.5
2002/0072369 A1 * 6/2002 Sasada et al. ............... 455/435

FOREIGN PATENT DOCUMENTS

JP          07322333       12/1995

OTHER PUBLICATIONS

Hai Xie, et al., "Dynamic Location Area Management and Performance Analysis" 43rd IEEE Vehicular Technology Conference, 1993.
Rong-Feng Chang, et al., "Dynamic Mobility Tracking for Wireless Personal Communication Networks" IEEE Communication Magazine, 1997.
Sami Tabbane, "Location Management Methods for Third-Generation Mobile Systems" IEEE Communications Magazine, Aug. 1997.

* cited by examiner

*Primary Examiner*—Lester G. Kincaid
*Assistant Examiner*—Fred A. Casca
(74) *Attorney, Agent, or Firm*—Crowell & Moring LLP

(57) ABSTRACT

One piece of information used in setting up the optimum location registration area is an area of a peripheral cell. However, in the current system, the area of a cell is set up by the predicted number of subscribers in the area, and therefore, depends on the location. Therefore, when a mobile communication terminal computes the optimum location registration area, it is necessary to obtain the size information about the peripheral cell, which can cause the problem of traffic. The mobile communication terminal in a cell signals a plurality of paging point nodes of mobility and traffic characteristic. Then, the plurality of paging point nodes sets up a location registration area of the mobile communication terminal according to the above mentioned information and network information. Thus, the location management of the mobile communication terminal can be efficiently realized, thereby reducing the traffic.

21 Claims, 10 Drawing Sheets

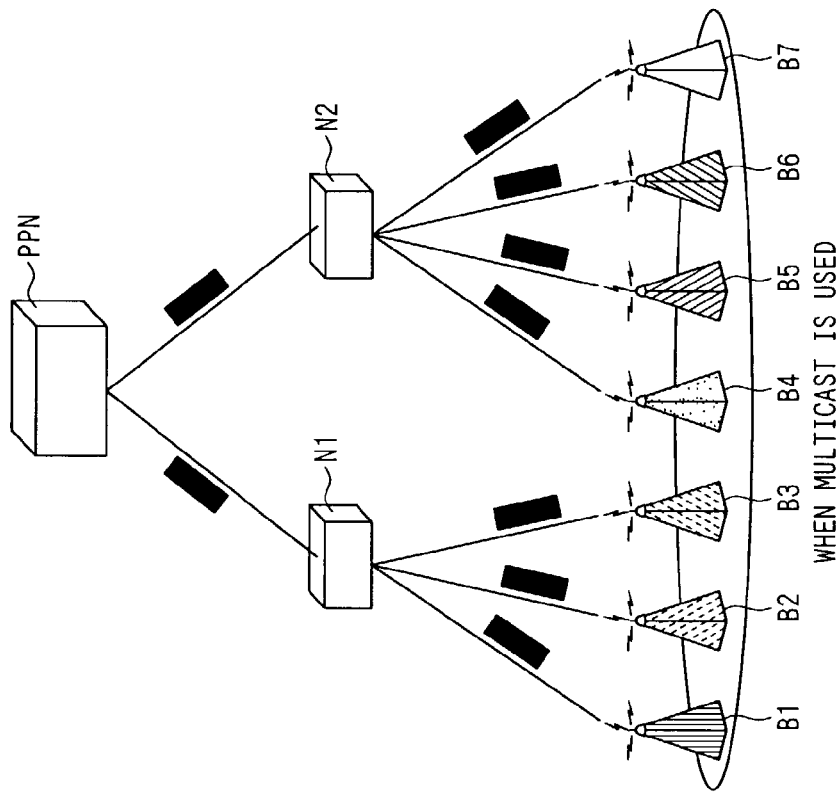
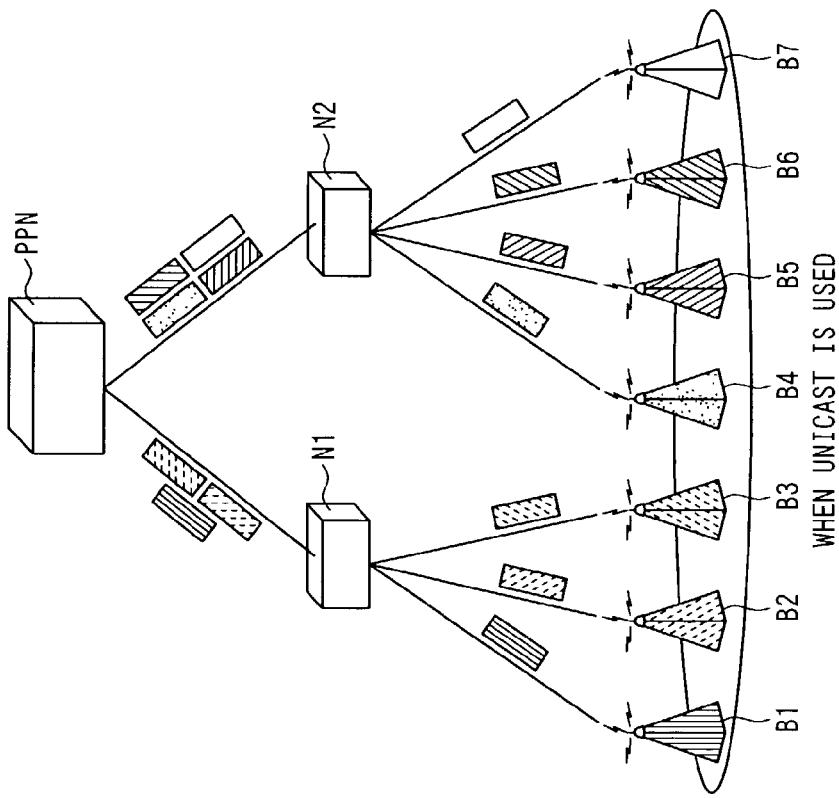

CLASS 1

CLASS 2

CLASS 3 (CELL)

METHOD OF LOCATION REGISTRATION, LOCATION REGISTRATION SYSTEM, MOBILE COMMUNICATION TERMINAL EQUIPMENT FOR SETTING UP LOCATION REGISTRATION AREA, AND PROGRAM FOR SETTING UP LOCATION REGISTRATION AREA

BACKGROUND OF THE INVENTION

1. Field of the Invention

The present invention relates to a method of location registration, a location registration system, a mobile communication terminal, an equipment for setting up location registration area, program for setting up location registration area, and more specifically to setting up a location registration area (also referred to as a location area) of a mobile communication terminal in a mobile communication system.

2. Description of the Related Art

In the conventional mobile communication system, the location of a mobile communication terminal not in communications is managed by location registration area formed by a plurality of cells. In the conventional mobile communication system, a location registration area is fixedly set beforehand in a network, and is unified for all terminals.

Generally, a change of a location registration area is triggered by a mobile communication terminal not in communications exiting an old location registration area and entering a new location registration area. When the terminal detects a change of location registration area identification information advertised by a base station, it notifies the network of the change, and the location registration area information about the mobile communication terminal is changed in the network. When a communication request for the terminal not in communications occurs, paging (general call) request signals are transmitted to all cells in the location registration area of the terminal in the network. Then, upon receipt of the paging request, the terminal returns a paging response to the network. Thus, the network can be informed of the cell (base station in the network) in which the terminal is located.

Assume that the optimum location registration area obtains the minimum sum of the location registration traffic of the terminal and the paging traffic. Then, the optimum location registration area depends on the mobility and traffic characteristics of the terminal. Therefore, the optimum location registration area generally different for each terminal. Furthermore, the mobility and traffic characteristics of the terminal change with time, the optimum location registration area for one terminal also changes with time.

Therefore, conventional method of the location management which uses the unified and fixed location registration area is inefficient. That is, in the conventional method, for example, the location management is performed in the same location registration area for a static mobile communication terminal and a mobile communication terminal which frequently changes its location registration area. Therefore, a wasteful traffic can arise when the location registration and paging operation are performed. Namely, the conventional method is insufficient.

The technology for solving the above mentioned problems can be, for example, in Japanese Unexamined Publication No. Heisei 7-322333. As a method of setting up a location registration area for each mobile communication terminal, this publication discloses a method of the mobile communication terminal computing and setting up the optimum location registration area, and a method of the base station computing and setting up the optimum location registration area.

However, the location registration system in the method disclosed in the above mentioned publication pays attention only to the traffic in the radio region, and the traffic in the mobile communication network is not considered.

Furthermore, in the location registration system in the method disclosed by the above mentioned publication, the mobile communication terminal or the base station determines a location area. Thus, there can be a problem with the traffic which the size information about peripheral cells required in setting up a location area is computed.

That is, an area of a peripheral cell is a piece of the information used in setting up the optimum location registration area. However, in the current system, an area of a cell is set up based on the predicted number of subscribers, and therefore depends on the location. For example, the areas of cells are different between a downtown area and a suburban area. Therefore, in the method of the above mentioned publication, it is necessary to obtain the size information about the peripheral cells when the mobile communication terminal computes the optimum location registration area, and there can be a problem with the traffic therewith.

The present invention has been developed to solve the problems with the above mentioned conventional technology. And an object of the present invention is to provide a location registration method, a location registration system, a mobile communication terminal, a location area setting equipment, and a location area setting program which are capable of realizing efficient location management of the mobile communication terminal with reduced traffic.

SUMMARY OF THE INVENTION

The location registration method according to an exemplary embodiment of the present invention is a method for determining a location registration area for a mobile communication terminal comprising the step of determining a location registration area according to network information about nodes and cells in a communication network.

In another exemplary embodiment of the present invention, mobility characteristics and a frequency of call arrival of the mobile communication terminal are referred to in addition to the network information when the location registration area is determined.

In another exemplary embodiment of the present invention, the network information comprises at least the information about the number of hops between base stations and a node which performs a paging operation in the communication network, the information about the number of hops between the base station and a location management node in the communication network, the information about the number of base stations in the communication network, the information about the number of cells, the information about cells' area, and the information about the number of nodes.

In another exemplary embodiment of the present invention, the total number of signals used in the location registration and paging for the mobile communication terminal is computed, and a location registration area minimizing this computed total number of signals is determined.

In another exemplary embodiment of the present invention, in computing the total number of signals, the number of hops between the base stations and the node which performs a paging operation in the communication network is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

In another exemplary embodiment of the present invention, in computing the total number of signals, the number of cells in a range, the number of nodes other than the base stations in the range, and the value of −1 are added up, this addition result is multiplied by the frequency of call arrival on the mobile communication terminal, the number of hops between the base stations and the node which performs the paging operation is multiplied by the frequency of call arrival on the mobile communication terminal, the number of hops between the base station and the location management node is multiplied by the frequency of changing location registration areas of the mobile communication terminal, and the multiplication results are added up.

In another exemplary embodiment of the present invention, the frequency of changing location registration areas of the mobile communication terminal is obtained by multiplying the number of base stations in the communication network by the cell area, and dividing the moving speed of the mobile communication terminal by the multiplication result.

In another exemplary embodiment of the present invention, the total number of signals is computed by increasing the number of base stations by one from a predetermined initial value, and the location registration area is set up according to the base station information minimizing the total number of signals.

In another exemplary embodiment of the present invention, the location registration system determines the location registration area of the mobile communication terminal, wherein: the mobile communication terminal comprises means for measuring the mobility characteristics and the frequency of call arrival, and signaling to a mobile communication network the measured values together with a location registration request; and a node in the mobile communication network comprises means for managing network information about nodes and cells in the communication network, and determines the location registration area of the mobile communication terminal according to the mobility characteristics, the frequency of call arrival, and the network information.

In another exemplary embodiment of the present invention, the network information comprises at least the information about the number of hops between base stations and a node which performs a paging operation in the communication network, the information about the number of hops between the base station and a location management node in the communication network, the information about the number of base stations in the communication network, the information about the number of cells, the information about cells' area, and the information about the number of nodes.

In another exemplary embodiment of the present invention, the total number of signals used in the location registration and paging for the mobile communication terminal is computed, and a location registration area minimizing this computed total number of signals is determined.

In another exemplary embodiment of the present invention, in computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

In another exemplary embodiment of the present invention, in computing the total number of signals, the number of cells in a range, the number of nodes other than the base stations in the range, and the value of −1 are added up, this addition result is multiplied by the frequency of call arrival on the mobile communication terminal, the number of hops between the base stations and the node which performs the paging operation is multiplied by the frequency of call arrival on the mobile communication terminal, the number of hops between the base station and the location management node is multiplied by the frequency of changing location registration areas of the mobile communication terminal, and the multiplication results are added up.

In another exemplary embodiment of the present invention, the frequency of changing location registration areas of the mobile communication terminal is obtained by multiplying the number of base stations in the communication network by the cell area, and dividing a moving speed of the mobile communication terminal by the multiplication result.

In another exemplary embodiment of the present invention, the total number of signals is computed by increasing the number of base stations by one from a predetermined initial value, and the location registration area is set up according to the base station information minimizing the total number of signals.

In another exemplary embodiment of the present invention, a mobile communication terminal for use in a location registration system which determines the location registration area of a mobile communication terminal comprises means for measuring the mobility characteristics and the frequency of call arrival, and signaling to a mobile communication network the measured values together with a location registration request.

In another exemplary embodiment of the present invention, a location area setting equipment for use in the location registration system which determines the location registration area of a mobile communication terminal comprises means for managing network information about nodes and cells in a communication network, and determines the location registration area of the mobile communication terminal according to mobility characteristics and a frequency of call arrival transmitted from the mobile communication terminal, and the network information.

In another exemplary embodiment of the present invention, the network information comprises at least the information about the number of hops between base stations and a node which performs a paging operation in the communication network, the information about the number of hops between the base station and a location management node in the communication network, the information about the number of base stations in the communication network, the information about the number of cells, the information about cells' area, and the information about the number of nodes.

In another exemplary embodiment of the present invention, the total number of signals used in the location registration and paging for the mobile communication terminal is computed, and a location registration area minimizing this computed total number of signals is determined.

In another exemplary embodiment of the present invention, in computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

In another exemplary embodiment of the present invention, in computing the total number of signals, the number of cells in a range, the number of nodes other than the base stations in the range, and the value of −1 are added up, the addition result is multiplied by the frequency of call arrival on the mobile communication terminal, the number of hops between the base stations and the node which performs the paging operation is multiplied by the frequency of call arrival on the mobile communication terminal, the number of hops between the base station and the location management node is multiplied by the frequency of changing location registration areas of the mobile the communication terminal, and the multiplication results are added up.

In another exemplary embodiment of the present invention, the frequency of changing location registration areas of the mobile communication terminal is obtained by multiplying the number of base stations in the communication network by the cell area, and dividing a moving speed of the mobile communication terminal by the multiplication result.

In another exemplary embodiment of the Present invention, the total number of signals is computed by increasing the number of base stations by one from a predetermined initial value, and the location registration area is set up according to the base station information minimizing the total number of signals.

In another exemplary embodiment of the present invention, a location area setting program computes the total number of signals used in the location registration and paging for a mobile communication terminal, and determines a location registration area minimizing this total number of signals, whereby in computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

In another exemplary embodiment of the present invention, the location area setting program computes the total number of signals used in the location registration and paging for a mobile communication terminal, and determines a location registration area minimizing this computed total number of signals, whereby in computing the total number of signals, the number of cells in a range, the number of nodes other than the base stations in the range, and the value of −1 are added up, the addition result is multiplied by the frequency of call arrival on the mobile communication terminal, the number of hops between the base stations and the node which performs a paging operation is multiplied by the frequency of call arrival on the mobile communication terminal, the number of hops between the base station and the location management node is multiplied by the frequency of changing location registration areas of the mobile communication terminal, and the multiplication results are added up.

In another exemplary embodiment of the present invention, the frequency of changing location registration areas of the mobile communication terminal is obtained by multiplying the number of base stations in the communication network by the cell area, and dividing a moving speed of the mobile communication terminal by the multiplication result.

In another exemplary embodiment of the present invention, the total number of signals is computed by increasing the number of base stations by one from a predetermined initial value, and the location registration area is set up according to the base station information minimizing the total number of signals.

In short, a location registration area is determined according to the network information which is the information about a node and a cell in a communication network, a mobile communication terminal measures the mobility characteristics and the frequency of call arrival, and signals to a mobile communication network the measured values together with a location registration request, and a node in the mobile communication network manages network information about nodes and cells in the communication network, and determines the location registration area of the mobile communication terminal according to the mobility characteristics, the frequency of call arrival, and the network information. Thus, the location of a mobile communication terminal can be efficiently managed, thereby reducing the traffic.

BRIEF DESCRIPTION OF THE DRAWINGS

FIG. 2 shows the number of paging request signals;

DETAILED DESCRIPTION OF THE PREFERRED EMBODIMENTS

Figure 1:
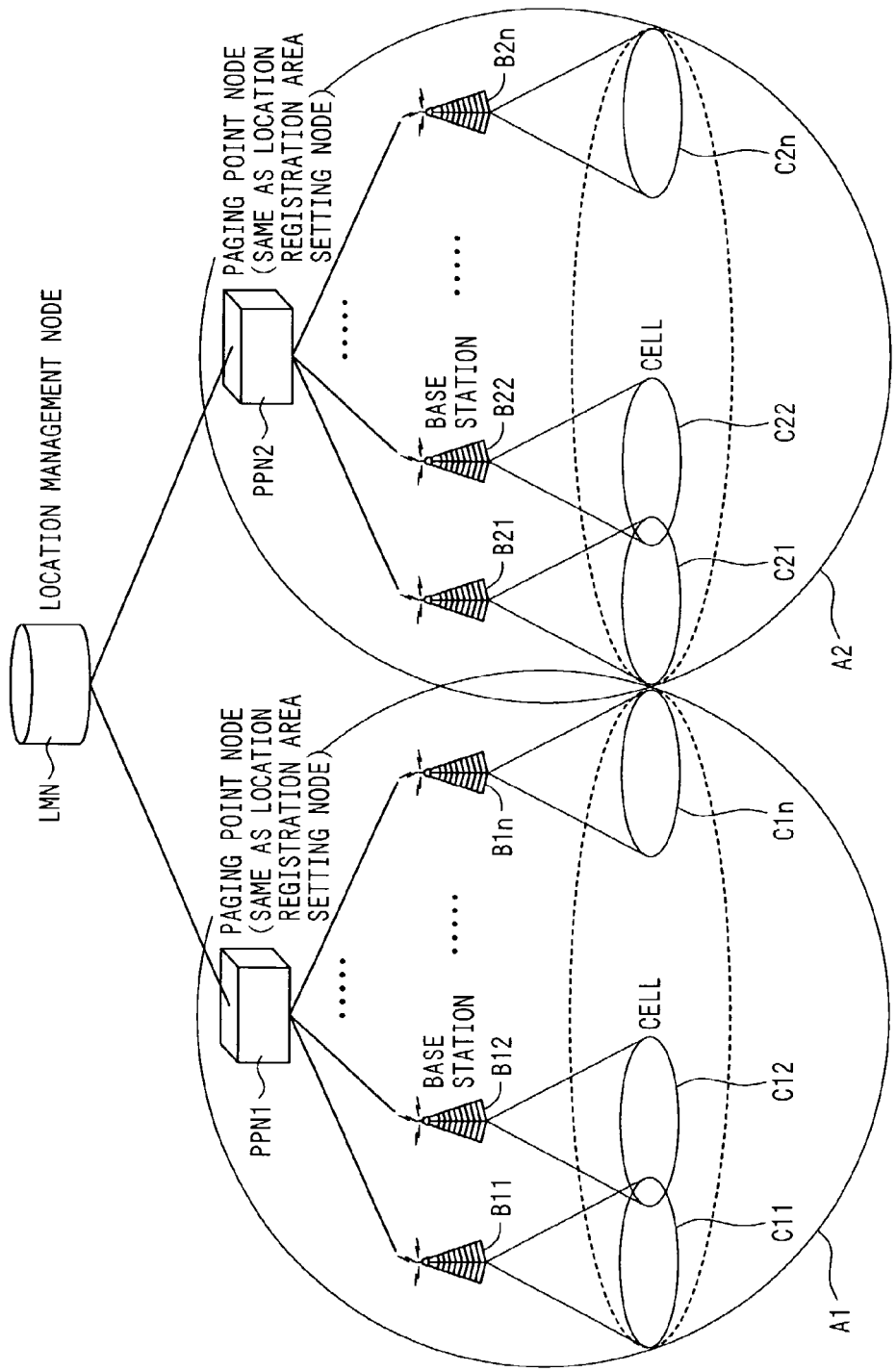
FIG. 1 is a block diagram showing to an embodiment of the location registration system according to the present invention.

The embodiments of the present invention are described below by referring to the attached drawings. The component commonly appearing in each drawing referred to in the explanation below is assigned the same reference numeral.

FIG. 1 shows an example of the configuration of the mobile communication system to which the location registration system according to the present invention is applied.

As shown in FIG. 1, the present system comprises a plurality of cells C11 to C1n, cells C21 to C2n, base stations B11 to B1n, base stations B21 to B2n, and paging point nodes PPN1 and PPN2 for executing a paging operation for each of the ranges A1 and A2 formed by nodes not shown in the attached drawings. Then, the location of a terminal not in communications is managed in a location management node LMN. If the location management is individually performed in each base station, the management process becomes complicated. On the other hand, by managing the location in an upper device, not in the base station, as in the present invention, the management can be centrally performed.

A location registration area setting node is provided with a location area setting equipment. According to the present embodiment, the paging point nodes PPN1 and PPN2 function as a location registration area setting node. That is, according to the present embodiment, for simplicity it is assumed that the paging point node PPN is physically the same as the location registration area setting node.

When the mobile communication terminal located in the above mentioned range A1 or A2 signals the information about its mobility and traffic characteristics, the optimum location registration area of the terminal is set in the mobile communication network according to the signaled information and the network information (number of hops, base stations, and cells, a cell area, and number of nodes).

In deriving the optimum location registration area, it is necessary to minimize the location control cost. That is, a location registration area is to be derived such that the sum of the location registration control cost and the paging control cost can be minimized.

In this example, in relation to the cost, the total number of signals transmitted in the network is considered. The following parameters affect the cost. That is, the parameters can be a location area change frequency u of a terminal, a frequency of call arrival a of a terminal, the number of cells $N_{cell}$ in a location area, the number of nodes $N_{node}$ other than the base stations in the location area, the number of hops $h_u$ between the location management node and the base station, and the number of hops $h_p$ between the paging point and the base stations. They are measured on either the terminal or the network, or the network manager sets them in advance.

When the total number of signals through the network is represented, the number of paging request signals depends on whether the location registration area is managed by a unicast address or a multicast address. That is, as shown in FIG. 2A, when a unicast is used, a signal is individually transmitted from the paging point node PPN to each of the base stations B1 to B7. Therefore, the total number of signals is large.

On the other hand, when a multicast is used as shown in FIG. 2B, a signal is not individually transmitted from the paging point node PPN to each of the base stations B1 to B7, but the halfway nodes N1 and N2 distribute a signal to each of the base stations B1 to B7, thereby reducing the total number of signals.

The cost ($C_{uni}$) required when the unicast shown in FIG. 2A and the cost ($C_{multi}$) required when the multicast shown in FIG. 2B are represented by the following equation (1).

$$C_{uni}=h_p N_{cell} a + h_p a + 2 h_u u$$

$$C_{multi}=(N_{cell}+N_{node}-1)a + h_p a + 2 h_u u \quad (1)$$

In the equation (1) above, the first term corresponds to the paging request cost, the second term corresponds to the paging response cost, and the third term corresponds to the location registration control cost. The paging request relating to the first term is a signal transmitted in the downstream direction. The paging response relating to the second term is a signal transmitted in the upstream direction. The location registration control in the third term flows in both upstream and downstream directions, and is multiplied by 2. In computing the cost $C_{multi}$ when using the multicast, 1 is subtracted (by adding −1) to remove the paging request node from the total number of nodes.

The location area change frequency u which is the probability per unit time is represented by the equation (2) using fluid flow model.

$$u = v/(\rho A_{LA}) \quad (2)$$

In the equation (2), v indicates the moving speed of a terminal, $A_{LA}$ indicates the area of a location registration area, ρ indicates the terminal density in the location registration area. On condition that all cells in the location registration area are in the same area ($A_{cell}$), the following equation (3) is set up.

$$A_{LA}=N_{cell} A_{cell} \quad (3)$$

In the equations (1) to (3), the optimum location registration area depending on the moving speed V and the frequency of call arrival a of the terminal is derived. In this case, the area $A_{LA}$ computed by the equation (3) is assigned to the equation (2), and the location area change frequency u computed by the equation (2) is assigned to the equation (1).

The optimum location registration area setting method is described below by referring to FIGS. 3 and 4.

Figure 3:
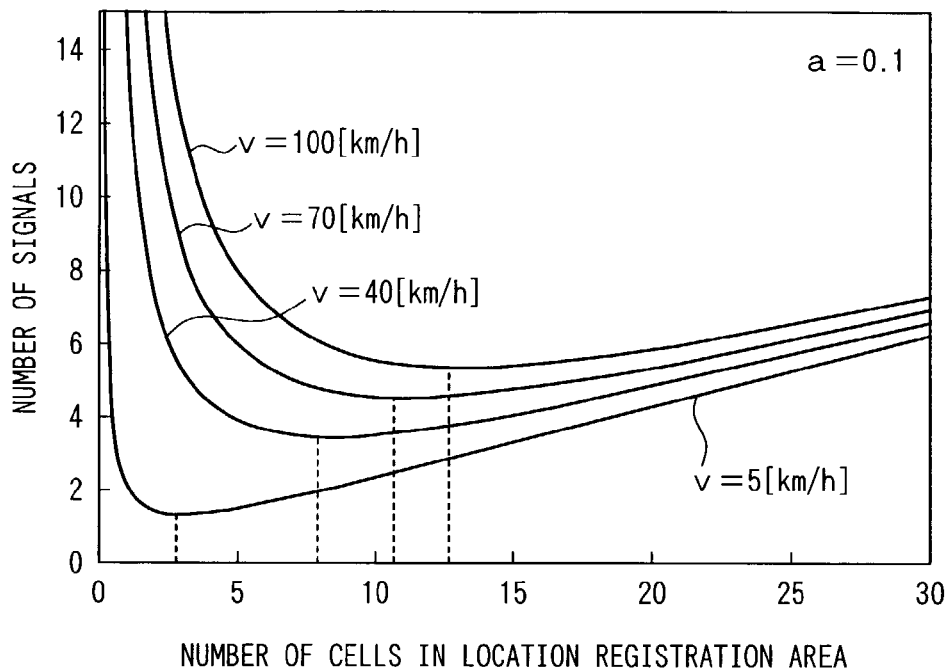
FIG. 3 shows the relationship between the moving speed and the optimum location registration area.

FIG. 3 shows the relation of the optimum location registration area to the moving speed when a unicast address is used. FIG. 4 shows the relation of the optimum location registration area to the frequency of call arrival when a unicast address is used. In FIGS. 3 and 4, the values shown in Table 1 are used as parameters.

TABLE 1

| | |
|---|---|
| v | 5/40/70/100 (km/h) |
| a | 0.01/0.1/0.5/1 (1/h) |
| $h_u$, $h_p$ | 2 |
| $A_{cell}$ | 12 (km²) |

That is, the moving speed v of a terminal can be represented by any value of 5, 40, 70, and 100 (km/h) used as a parameter. The frequency of call arrival a of a terminal can be represented by any value of 0.01, 0.1, 0.5, and 1 (1/h) as a parameter. As the number of hops $h_u$ between a node and a base station and the number of hops $h_p$ between a paging point and base stations can be 2 as a parameter. The area $A_{cell}$ of a cell can be represented by 12 (km²) as a parameter.

FIG. 3 shows the number of signals when the frequency of call arrival is kept constant and only the moving speed changes. The number of signals (vertical axis) to the number of cells (horizontal axis) at the moving speed v=5, 40, 70, 100 (km/h) is indicated by solid lines. In each solid line, the value (broken line) of the number of cells corresponding to the minimum value of the number of signals indicates the optimum location registration area size. In FIG. 3, with an increasing moving speed, the optimum location registration area becomes larger.

Figure 4:
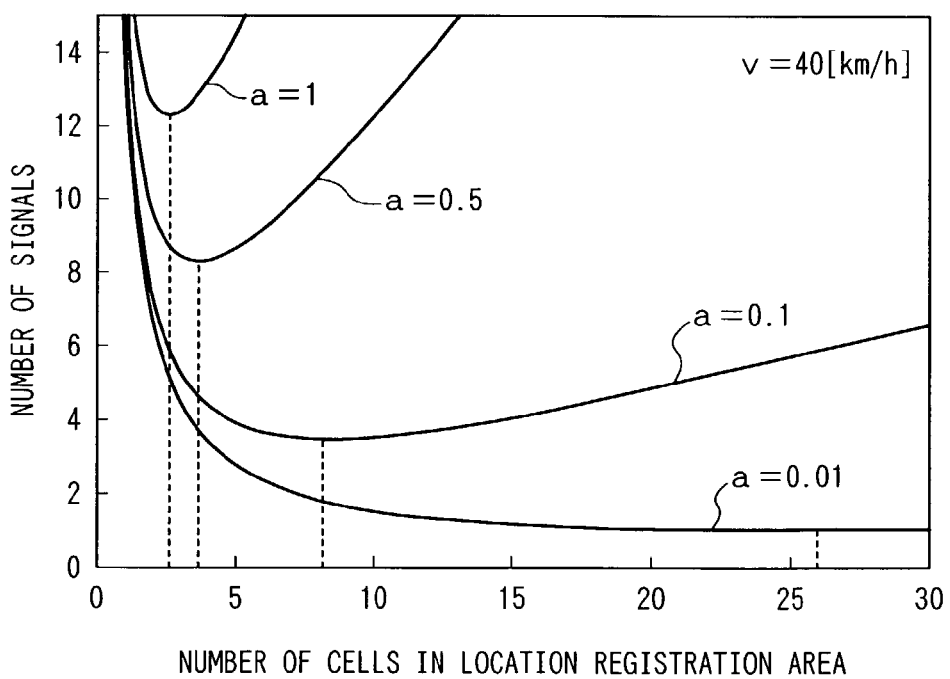
FIG. 4 shows the relationship between the frequency of call arrival and the optimum location registration area.

FIG. 4 shows the number of signals when only the frequency of call arrival changes with the moving speed kept constant. The solid line indicates the number of signals (vertical axis) to the number of cells (horizontal axis) in the frequency of call arrival a =0.01, 0.1, 0.5, 1 (1/h). In each solid line, the value (broken line) of the number of cells corresponding to the minimum value of the number of signals indicates the optimum location registration area size. In FIG. 4, with an increasing frequency of call arrival, the optimum location registration area becomes smaller.

However, the results shown in FIGS. 3 and 4 are the results on condition that the area of all cells in the location registration area is fixed. In the actual system, it is necessary to derive the optimum location registration area with the size of the peripheral cells taken into account.

Since the mobility and traffic characteristics of a terminal changes with time, the optimum location area also changes with time, and it is necessary to dynamically set the location area. The change of the location area is triggered by the following two cases. That is, the case in which a terminal exits the old location area (case A), and the case in which the optimum location area changes (case B).

The above mentioned case A refers to a general location registration trigger in a mobile communication network. A location is registered if a terminal detects a change of the location area information advertised by a base station, thereby changing the location area.

In the case B above, for example, the optimum location area can be in the old location area, and can be smaller than the old location area. For example, assume that a user goes back home by car. In this case, the terminal possibly does not exit the old location area to enter another area. Therefore, a mechanism of a trigger of changing a location area with this case taken into account is required.

The method of dynamically setting a location area can be the following two methods, that is, a flexible location area and a multiplexed location area. In the case A above, the shape and the area of the location area can be freely set. In the case B above, the location areas of a plurality of classes (sizes) are prepared.

Figure 5:
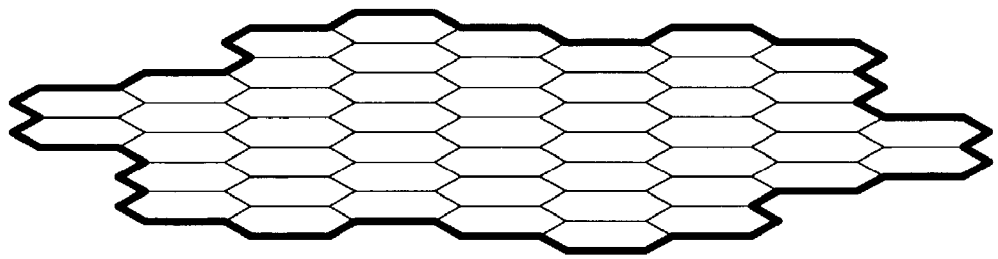
FIG. 5 shows the multiplexed location area which is one of the location area dynamic setting methods.
Figure 5:
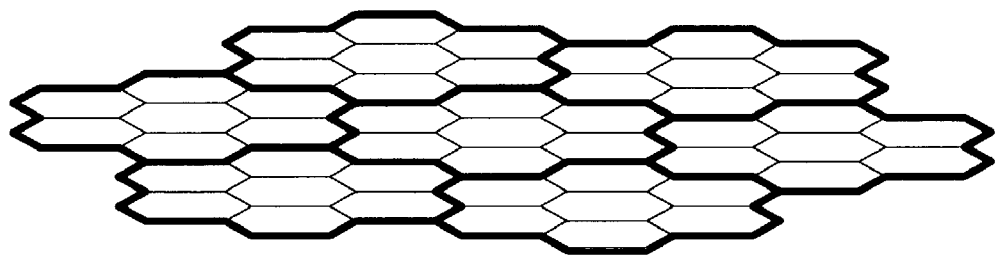
Figure 5:
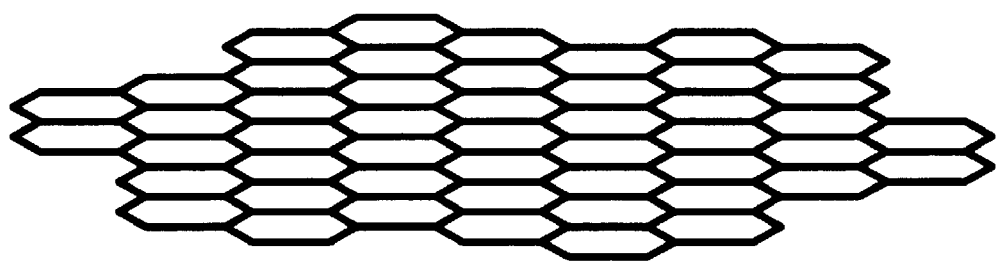

FIGS. 5A to 5C show the cases in which three classes, for example, a class 1 location area to a class 3 location area are set. By referring to FIG. 5A, the class 1 location area indicated by the bold line shown in FIG. 5A is divided into a plurality of class 2 location areas as indicated by the bold line shown in FIG. 5B. In this example, the class 1 location area is divided into seven class 2 location areas. Each of the class 1 location areas indicated by the bold line shown in FIG. 5B is further divided into a plurality of class 3 location areas as indicated by the bold line shown in FIG. 5C. In this example, each class 1 location area is divided into 49 class 3 location areas. The class 3 location area shown in FIG. 5C is the same in size as a cell. Thus, by preparing plural classes of location areas, a cell belongs to only one location area in each class.

When a location area is dynamically set, it is significant to have the recognition of a location area match between the terminal and the network. In the case of flexible location areas, for example, all identification numbers of base stations in the location area can be used, or the base stations can advertise the coordinate (latitude/longitude, etc.) information about the respective base stations. On the other hand, in the case of multiplexed location areas, if identification numbers are assigned to plural classes of location areas, matching can be easily attained by signaling to the terminal the location area identification number of the class depending on the mobility and traffic characteristics when a location registration reply is issued.

By each base station advertising the information including location area identification numbers of all classes, the terminal can easily detect a change of a location area by only checking the identification number of the class to which the terminal belongs.

Furthermore, a multicast can be used in either the flexible location area system or the multiplexed location area system. In the case A described above, it is necessary to consider a signal, etc. for assigning a multicast address to a new area. On the other hand, in the case B described above, the amount of paging signals can be reduced by assigning in advance multicast addresses as the identification information about the location areas of respective classes. As described above by referring to FIG. 2, the amount of the paging request signals and the amount of location registration reply signals are different between these two systems.

Figure 6:
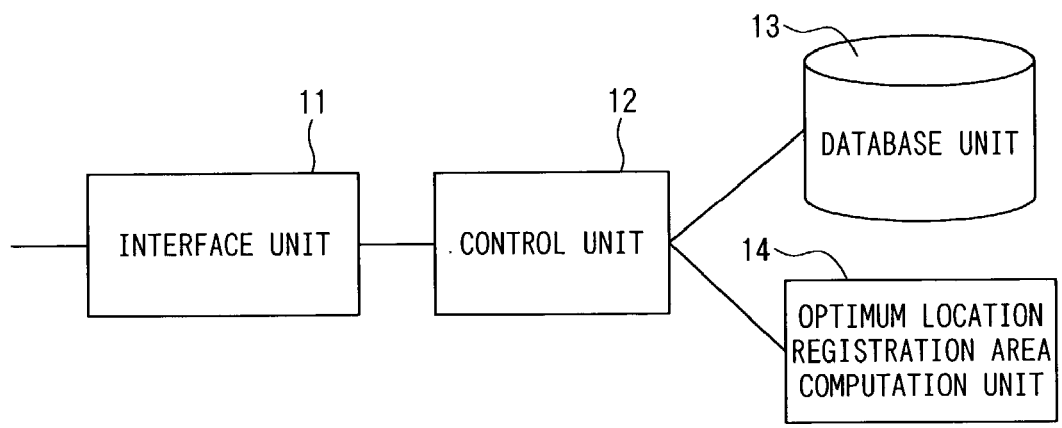
FIG. 6 shows an example of the configuration of the location registration area setting node device according to the present invention.

FIG. 6 shows an example of the configuration of the device of the location registration area setting node according to the present system. As shown in FIG. 6, the location registration area setting node comprises an interface unit 11, a control unit 12, a database unit 13, and an optimum location registration area computation unit 14.

The database unit 13 stores the network information about nodes and cells in the network. The network information can be, for example, the number of hops, the number of base stations, the number of cells, and the number of nodes.

The information about the moving speed and the frequency of call arrival notified by the mobile communication terminal is transmitted together with the network information stored in the database unit 13 by the control unit 12 through the interface unit 11 to the optimum location registration area computation unit 14. The optimum location registration area computation unit 14 computes the optimum location registration area by the above listed equations (1) to (3).

Figure 7:
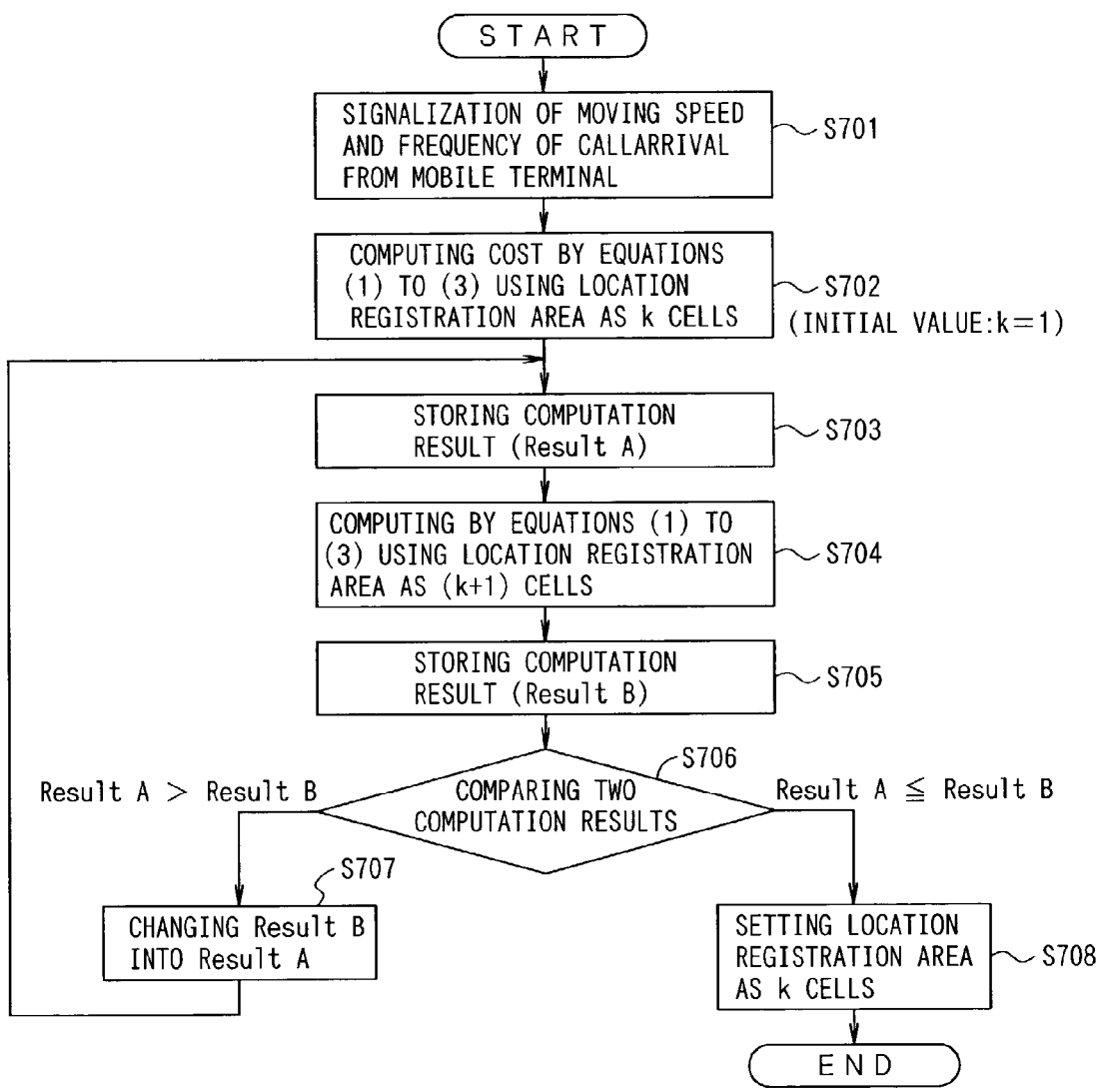
FIG. 7 is a flowchart of a optimum location registration area computation unit.

FIG. 7 is a flowchart of the operations of the optimum location registration area computation unit 14. In FIG. 7, when the mobile communication terminal signals to the optimum location registration area computation unit 14 the moving speed and the frequency of call arrival (step S701), the unit computes the cost by the above listed equations (1) to (3) using the location registration area as k cells (step S702). The initial value k is 1. The unit stores the computation result (Result A) (step S703).

Then, the cost is computed by the above listed equations (1) to (3) using the location registration area as (k+1) cells (step S704). The unit stores the computation result (Result B) (step S705).

The above mentioned computation results (Result A) and (Result B) are compared with each other (step S706). If the computation result (Result A) is larger than the computation result (Result B) as a comparison result, then the computation result (Result B) is set as a new computation result (Result A) (step S706→S707), and is then stored (step S703). On the other hand, if the computation result (Result B) is equal to or larger than the computation result (Result A) as a comparison result, then the location registration area is set as k cells (step S706→S708). In the above mentioned procedure, the location registration area is set.

Figure 8:
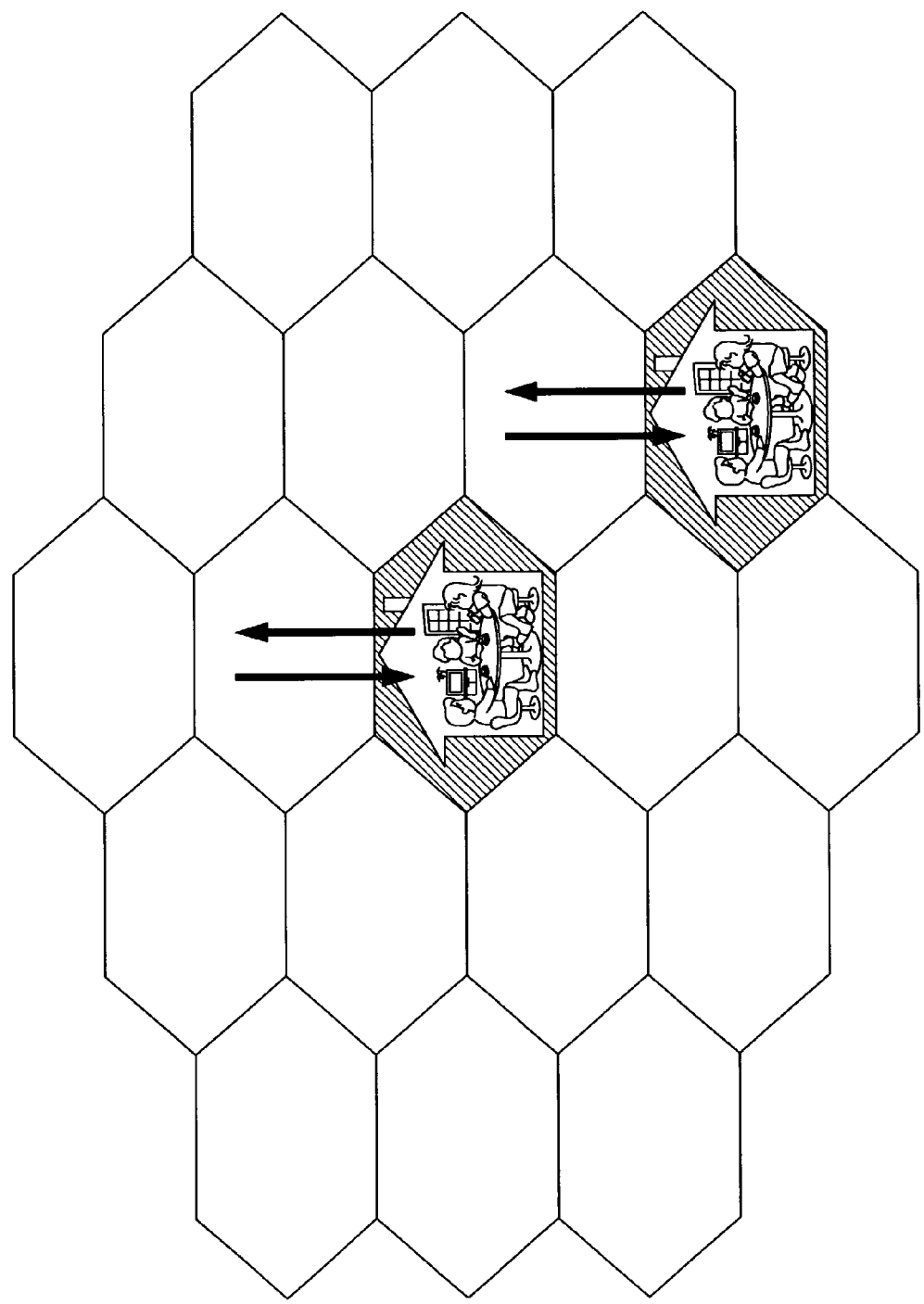
FIG. 8 shows the first example of applying the present invention.
Figure 9:
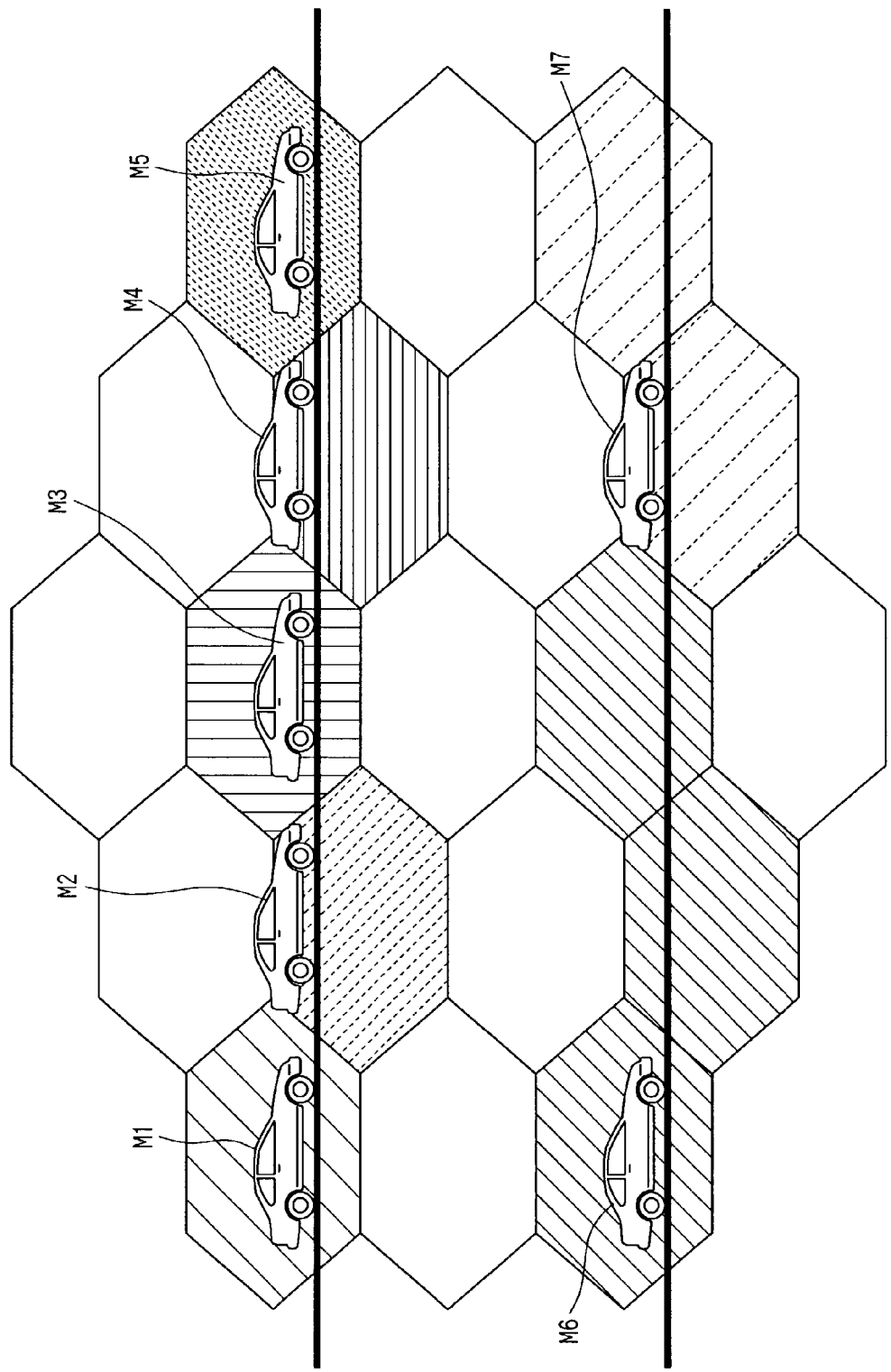
FIG. 9 shows the second example of applying the present invention.

FIGS. 8 and 9 show examples of applying the present system. In FIG. 8, the mobile communication terminal is in a static state. For example, the user of the mobile terminal stays at home. When the mobile communication terminal is in the static state, only the cell in which the terminal is located is set as a location registration area. Thus, as compared with the conventional technology in which all cells in the unified location registration areas are paged, the paging traffic can be considerably reduced.

In FIG. 9, the mobile communication terminal is moving. For example, the user of the mobile terminal is in a car which is being driven on a speedway. If the moving speed of the terminal is moving slowly as in the traffic jam unlike the mobile communication terminal on the speedway, then the location registration area is set small. For example, each of the cars M1 to M5 (each user) is assigned one cell. Thus, as compared with the conventional technology, the reduction of the paging traffic can be realized. On the other hand, if the moving speed of the terminal is high, the location registration area is set large. For example, each of the cars (each user) M6 and M7 is assigned a plurality of cells. Thus, the reduction of the location registration traffic can be realized.

In the example shown in FIGS. 8 and 9, only the moving speed is taken into account. Generally, it is effective to assign a large location registration area to a user having a high moving speed, and assign a small location registration area to a user having a low moving speed.

Additionally, the frequency of call arrival is also a parameter affecting the location registration area size. That is, it is effective to assign a small location registration area to a user having a high frequency of call arrival is assigned, and assign a large location registration area to a user having a low frequency of call arrival.

As described above, the size of the optimum location registration area depends of the mobility and traffic characteristics of the user. Therefore, the location control can be efficiently performed by the user setting the optimum location registration area when the user performs location registration.

The optimum location registration area is to be derived based on the moving speed and the frequency of call arrival of a terminal. In this example, these parameters are measured by the mobile communication terminal.

First, a realizing method based on the moving speed can be used by measuring the number of changes of cells per unit time. However, in this method, it cannot be determined whether a mobile object is moving in a predetermined range or only linearly. To solve the problem, the base stations can advertise the coordinate (latitude/longitude, etc.) information about the respective base stations. A terminal stores its base station coordinates at which it last registered its location, and the coordinates and the current base station coordinates are used in combination each time the base stations are changed, thereby measuring the moving speed.

As to the frequency of call arrival, the precision is the same regardless of the measurement made on the terminal side or the network side. However, when it is made on the terminal side, computation is to be performed. A practical method can be the following (1) or (2). That is, (1) method of measuring the number of call arrival within a predetermined time (2) method of setting the frequency of call arrival in a database (for example, defining it as 9:00 to 10:00 on Monday, etc.)

Figure 10:
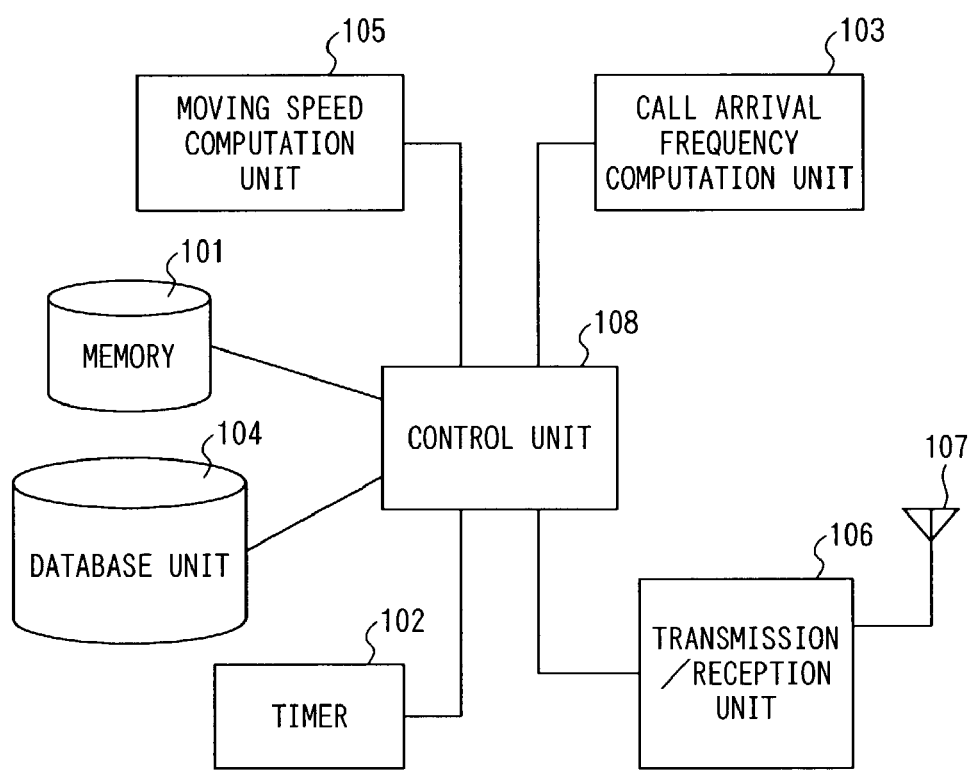
FIG. 10 shows the configuration of the mobile communication terminal device according to the present invention.

FIG. 10 shows an example of the configuration of the mobile communication terminal device in the present system. In FIG. 10, the mobile communication terminal comprises: memory 101 storing the location information and the number of received paging requests in a unit time about the base station which has recently performed location registration; a timer 102; a call arrival frequency computation unit 103 for counting the number of call arrival within a predetermined time and computing the frequency of call arrival; a database unit 104 storing information about the frequency of call arrival in a database; a moving speed computation unit 105 for computing a moving speed; a transmission/reception unit 106 for transmitting and receiving a signal to and from a base station; an antenna 107; and a control unit 108 for controlling each unit.

Described below is the moving speed. Each time a terminal changes base stations, it computes the moving speed through the moving speed computation unit 105 according to the location information obtained from the base stations and the information stored in the timer 102 and the memory 101.

Then, the frequency of call arrival is described below. Using the timer 102 and the memory 101, the call arrival frequency computation unit 103 computes the number of received paging requests in a unit time (for example, one hour).

Furthermore, the call arrival frequency computation unit 103 compares the result with the information stored in the database unit 104, performs recomputation, updates the database information, and stores the result in the database unit 104.

As described above, the mobile communication terminal has the functions of measuring its own mobility and traffic characteristics of the terminal, and of advertising the location area setting equipment its own mobility and traffic characteristics together with the location registration request.

Figure 11:
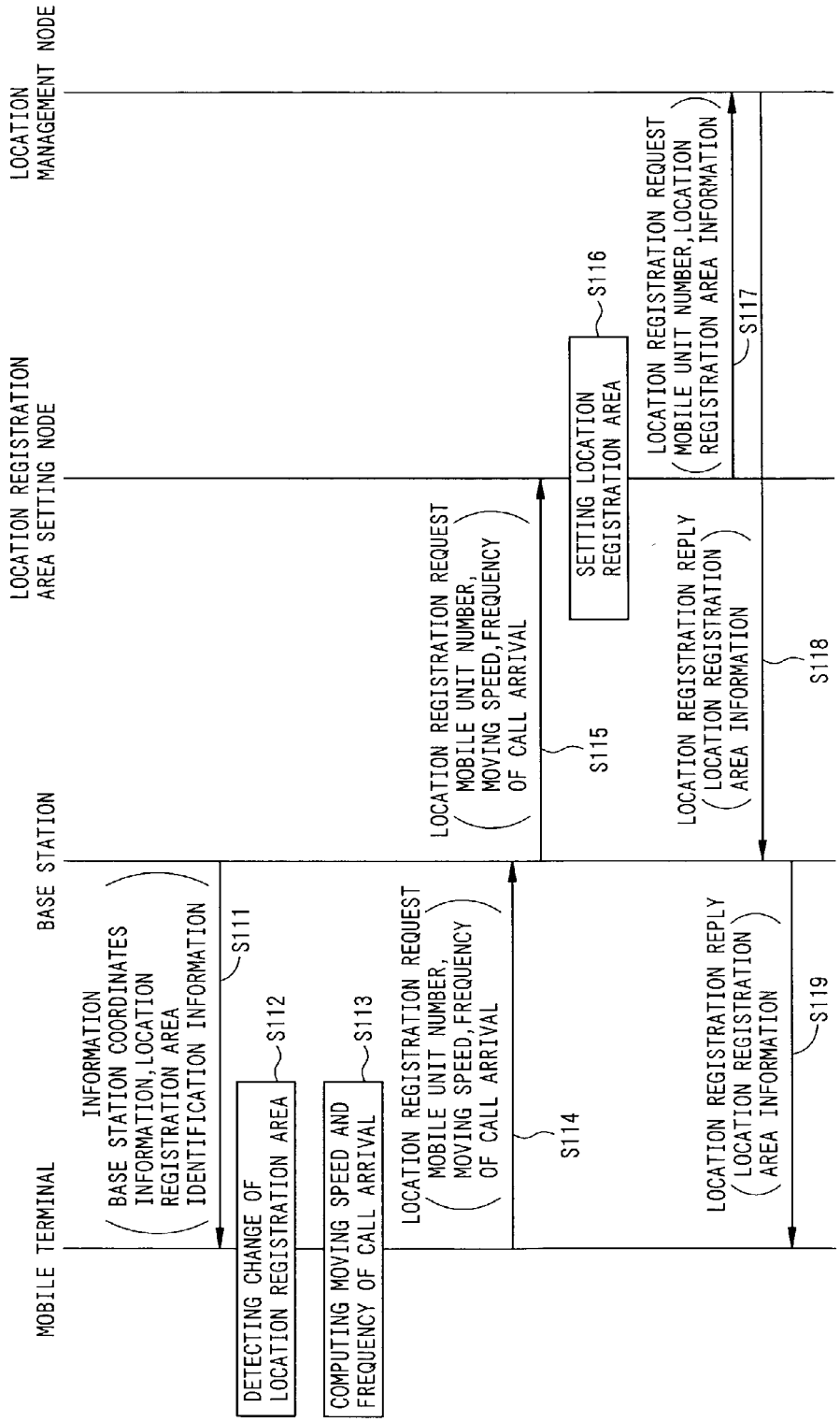
FIG. 11 shows the procedure of the location registration according to the present invention.

FIG. 11 is a sequence chart showing the location registration procedure in the present system. FIG. 11 practically shows operation sequences of a mobile communication terminal, a base station, a location registration area setting node, and a location management node. When the base station advertises to the mobile communication terminal the base station coordinates information and the location registration area identification information (step S111), the mobile communication terminal detects that the location registration area is changed (step S112). Then, the mobile communication terminal computes the moving speed and the frequency of call arrival (step S113).

Then, the mobile communication terminal transmits a location registration request obtained by adding the computed moving speed and frequency of call arrival to a mobile unit number to the base station (step S114). Upon receipt of the request, the base station transmits it to the location registration area setting node (step S115). Then, the location registration area setting node sets the location registration area (step S116). The location registration area setting node transmits the location registration request obtained by adding the location registration area information to the mobile unit number to the location management node (step S117).

Upon receipt of the request, the location management node transmits the location registration reply including the location registration area information to the base station (step S118). Upon receipt of the reply, the base station transmits it to the mobile communication terminal (step S119)

In the above mentioned embodiment, only the size is considered when a location registration area is set. However, according to the present invention, when a movement direction of a terminal can be specified, for example, when the terminal is moving on a speedway, etc., the shape of the location registration area can be set by associating the cell arrangement information stored in network with the map information.

Furthermore, in the above mentioned embodiment, the trigger of the change of a location registration area is explained by referring to the case in which a mobile unit exits an old location registration area. Practically, although the terminal does not exit the old location registration area, the optimum location registration area can be changed. Therefore, the present invention can be applied when the optimum location registration area is updated.

In addition, according to the present embodiment, the terminal measures the frequency of call arrival as a parameter indicating the traffic characteristic of a mobile communication terminal, but the parameter indicates the same precision when it is measured on the terminal side and the network side. Therefore, the present invention can be applied when the frequency of call arrival is measured on the network.

According to the present embodiment, the cost is evaluated by the total number of signals transmitted in the network, but can also be evaluated based on the amount of signals, the number of radio channels, and the network load.

As described above, according to the present system, when a location registration area is set, the traffic evaluation is performed with the network information (number of hops, number of base stations, number of cells, cell area, number of nodes) taken into account. Furthermore, a location registration area setting equipment is provided in the mobile communication network for setting the location registration area of the mobile communication terminal according to the information (number of hops, number of base stations, cell area, number of nodes) about the mobility and traffic characteristics informed of by the mobile communication terminal, and the network information. (Location registration method, Location registration area setting program)

In the above mentioned location registration system, the following location registration method can be realized. That is, the location registration method in which the location registration area for a mobile communication terminal is determined according to the network information about nodes and cells in the communication network is realized in the above mentioned system. In this location registration method, the mobility characteristics and the frequency of call arrival of the mobile communication terminal are referred to in addition to the network information when the location registration area is determined. The network information includes at least the information about the number of hops between base stations and a node which performs a paging operation in the communication network, the information about the number of hops between the base station and a location management node in the communication network, the information about the number of base stations in the communication network, the information about the number of cells, the information about cells' area, and the information about the number of nodes.

The total number of signals used in the location registration and paging for the mobile communication terminal is computed, and a location registration area having the minimum total number of signals is determined. In computing the total number of signals, the number of hops between the base stations and the node which performs a paging operation in the communication network is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up. Otherwise, the number of cells in a range, the number of nodes other than the base stations in the range, and the value of −1 are added up, the addition result is multiplied by the frequency of call arrival on the mobile communication terminal, the number of hops between the base stations and the node which performs a paging operation is multiplied by the frequency of call arrival on the mobile communication terminal, the number of hops between the base station and the location management node is multiplied by the frequency of changing location registration areas of the mobile communication terminal, and the multiplication results are added up.

The frequency of changing location registration areas of the mobile communication terminal is obtained by multiplying the number of base stations in the communication network by the cell area, and dividing the moving speed of the mobile communication terminal by the multiplication result. The total number of signals is computed by increasing the number of base stations by one from a predetermined initial value, and the location registration area is set up according to the base station information having the smallest total number of signals.

In the above mentioned location registration system, the following location registration area setting program is used. That is, the total number of signals used in the location registration and paging for the mobile communication terminal is computed, and a location registration area having the minimum total number of signals is determined. In computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

In the above mentioned location registration system, the following location registration area setting program is used. That is, the total number of signals used in the location registration and paging for the mobile communication terminal is computed, and a location registration area having the minimum total number of signals is determined. In computing the total number of signals, the number of cells in a range, the number of nodes other than the base stations in the range, and the value of −1 are added up, the addition result is multiplied by the frequency of call arrival on the mobile communication terminal, the number of hops between the base stations and the node which performs a paging operation is multiplied by the frequency of call arrival on the mobile communication terminal, the number of hops between the base station and the location management node is multiplied by the frequency of changing location registration areas of the mobile communication terminal, and the multiplication results are added up.

The frequency of changing location registration areas of the mobile communication terminal is obtained by multiplying the number of base stations in the communication network by the cell area, and dividing the moving speed of the mobile communication terminal by the multiplication result. The total number of signals is computed by increasing the number of base stations by one from a predetermined initial value, and the location registration area is set up according to the base station information having the smallest total number of signals.

If the above mentioned programs are prepared, and the computer is controlled using the programs, the location registering operation can be performed as described above. A storage medium for storing the programs can be any of various storage media such as semiconductor memory, a magnetic disk, an optical disk, etc.

As described above, according to the present invention, a location registration area can be set up depending on the mobility and traffic characteristics of a user. Therefore, as compared with the conventional location management method, a sum of the location registration traffic and the paging traffic can be reduced in the mobile communication network. Furthermore, according to the present invention, more efficient location registration can be performed in traffic in the network than in the above mentioned technology of the publication.

What is claimed is:

1. A location registration method for determining a location registration area for a mobile communication terminal, comprising the step of
   determining the location registration area according to network information about nodes and cells in a communication network;
   wherein mobility characteristics and a frequency of call arrival of the mobile communication terminal are referred to in addition to the network information when the location registration area is determined; and
   wherein the network information comprises at least information about the number of hops between base stations and a node which performs a paging operation in the communication network, information about the number of hops between the base station and a location management node in the communication network, information about the number of base stations in the communication network, information about the number of cells, information about cells' area, and information about the number of nodes.

2. The location registration method according to claim 1, wherein
   a total number of signals used in the location registration and paging for the mobile communication terminal is computed, and a location registration area minimizing this computed total number of signals is determined.

3. The location registration method according to claim 1, wherein
   in computing the total number of signals, the number of hops between the base stations and the node which performs a paging operation in the communication network is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

4. The location registration method according to claim 1, wherein
   in computing the total number of signals, the number of cells in a range, the number of nodes other than base stations in the range, and a value of −1 are added up, this addition result is multiplied by a frequency of call arrival on the mobile communication terminal, the number of hops between the base stations and the node which performs the paging operation is multiplied by the frequency of call arrival on the mobile communication terminal, the number of hops between the base station and the location management node is multiplied by a frequency of changing location registration areas of the mobile communication terminal, and the multiplication results are added up.

5. The location registration method according to claim 3, wherein
   the frequency of changing location registration areas of the mobile communication terminal is obtained by multiplying the number of base stations in the communication network by the cell area, and dividing a moving speed of the mobile communication terminal by the multiplication result.

6. The location registration method according to any one of claims 3 to 5, wherein
   the total number of signals is computed by increasing the number of base stations by one from a predetermined initial value, and a location registration area is set up according to the base station information minimizing the total number of signals.

7. A location registration system for determining a location registration area of a mobile communication terminal, wherein
   the mobile communication terminal comprises means for measuring mobility characteristics and a frequency of call arrival, and signaling to a mobile communication network the measured values together with a location registration request;
   a node in the mobile communication network comprises means for managing network information about nodes and cells in the communication network, and determines a location registration area of the mobile communication terminal according to the mobility characteristics, the frequency of call arrival, and the network information; and
   the network information comprises at least information about the number of hops between base stations and a node which performs a paging operation in the communication network, information about the number of hops between the base station and a location management node in the communication network, information about the number of base stations in the communication network, information about the number of cells, information about cell' area, and information about the number of nodes.

8. The location registration system according to claim 7, wherein
   a total number of signals used in the location registration and paging for the mobile communication terminal is computed, and a location registration area minimizing this computed total number of signals is determined.

9. The location registration system according to claim 8, wherein
   in computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

10. The location registration system according to claim 8, wherein
    in computing the total number of signals, the number of cells in a range, the number of nodes other than base stations in the range, and a value of −1 are added up, this addition result is multiplied by a frequency of call arrival on the mobile communication terminal, the number of hops between the base stations and the node which performs the paging operation is multiplied by the frequency of call arrival on the mobile communication terminal, the number of hops between the base station and the location management node is multiplied by a frequency of changing location registration areas of the mobile communication terminal, and the multiplication results are added up.

11. The location registration system according to claim 10, wherein
the frequency of changing location registration areas of the mobile communication terminal is obtained by multiplying the number of base stations in the communication network by the cell area, and dividing a moving speed of the mobile communication terminal by the multiplication result.

12. The location registration system, according to any one of claims 9 to 11, wherein
the total number of signals is computed by increasing the number of base stations by one from a predetermined initial value, and a location registration area is set up according to the base station information minimizing the total number of signals.

13. A location area setting equipment in a location registration system for determining a location registration area of a mobile communication terminal, comprising:
means for managing network information about nodes and cells in a communication network, wherein the location registration area of the mobile communication terminal is determined according to mobility characteristics, a frequency of call arrival transmitted from the mobile communication terminal, and the network information;
wherein the network information comprises at least information about the number of hops between base stations and a node which performs a paging operation in the communication network, information about the number of hops between the base station and a location management node in the communication network, information about the number of base stations in the communication network, information about the number of cells, information about cell' area, and information about the number of nodes.

14. A location area setting equipment in a location registration system for determining a location registration area of a mobile communication terminal, comprising:
means for managing network information about nodes and cells in a communication network, wherein the location registration area of the mobile communication terminal is determined according to mobility characteristics, a frequency of call arrival transmitted from the mobile communication terminal, and the network information;
wherein
a total number of signals used in the location registration and paging for the mobile communication terminal is computed, and a location registration area minimizing this computed total number of signals is determined; and
in computing the total number of signals, the number of hops is multiplied by the number of cells, and by the frequency of call arrival on the mobile communication terminal, the number of hops is multiplied by the frequency of call arrival on the mobile communication terminal, the number of hops between the base station and the location management node managing the location of the mobile communication terminal is multiplied by the frequency of changing location registration areas of the mobile communication terminal, and the multiplication results are added up.

15. A location area setting equipment in a location registration system for determining a location registration area of a mobile communication terminal, comprising:
means for managing network information about nodes and cells in a communication network, wherein the location registration area of the mobile communication terminal is determined according to mobility characteristics, a frequency of call arrival transmitted from the mobile communication terminal, and the network information;
wherein
a total number of signals used in the location registration and paging for the mobile communication terminal is computed, and a location registration area minimizing this computed total number of signals is determined; and
in computing the total number of signals, the number of cells in a range, the number of nodes other than base stations in the range, and a value of −1 are added up, an addition result is multiplied by a frequency of call arrival on the mobile communication terminal, the number of hops between the base stations and the node which performs the paging operation is multiplied by the frequency of call arrival on the mobile communication terminal, the number of hops between the base station and the location management node is multiplied by a frequency of changing location registration areas of the mobile communication terminal, and the multiplication results are added up.

16. The location area setting equipment according to claim 14, wherein
the frequency of changing location registration areas of the mobile communication terminal is obtained by multiplying the number of base stations in the communication network by the cell area, and dividing a moving speed of the mobile communication terminal by the multiplication result.

17. The location area setting equipment according to any of claims 14 to 16, wherein
the total number of signals is computed by increasing the number of base stations by one from a predetermined initial value, and a location registration area is set up according to the base station information minimizing the total number of signals.

18. A computer-readable medium encoded with a computer program for determining a location registration area minimizing this total number of signals by computing a total number of signals used in the location registration and paging for a mobile communication terminal, comprising in computing the total number of signals, the computer program comprising instructions for:
multiplying the number of hops by the number of cells, and by the frequency of call arrival on the mobile communication terminal;
multiplying the number of hops by the frequency of call arrival on the mobile communication terminal;
multiplying the number of hops between the base station and the location management node managing the location of the mobile communication terminal by the frequency of changing location registration areas of the mobile communication terminal; and
adding up the multiplication results.

19. A computer-readable medium encoded with a computer program for determining a location registration area minimizing this computed total number of signals by computing a total number of signals used in the location registration and paging for a mobile communication terminal, comprising in computing the total number of signals, the computer program comprising instructions for:
- adding up the number of cells in a range, the number of nodes other than base stations in the range, and a value of—1;
- multiplying the addition result by a frequency of call arrival on the mobile communication terminal;
- multiplying the number of hops between the base stations and the node which performs a paging operation by the frequency of call arrival on the mobile communication terminal;
- multiplying the number of hops between the base station and the location management node by a frequency of changing location registration areas of the mobile communication terminal; and
- adding up the multiplication results.

20. The computer-readable medium encoded with a computer program according to claim 18, wherein a frequency of changing location registration areas of the mobile communication terminal is obtained by multiplying the number of base stations in the communication network by the cell area, and dividing a moving speed of the mobile communication terminal by the multiplication result.

21. The computer-readable medium encoded with a computer program according to any one of claims 18 to 20, wherein the total number of signals is computed by increasing the number of base stations by one from a predetermined initial value, and a location registration area is set up according to the base station information minimizing the total number of signals.

* * * * *